United States Patent [19]

Pearce

[11] 4,071,602
[45] Jan. 31, 1978

[54] SELECTIVE SEPARATION OF SULFUR OXIDES FROM CARBON DIOXIDE IN AN EFFLUENT GAS STREAM

[75] Inventor: Roscoe L. Pearce, Lake Jackson, Tex.

[73] Assignee: The Dow Chemical Company, Midland, Mich.

[21] Appl. No.: 633,746

[22] Filed: Nov. 20, 1975

[51] Int. Cl.² .................................................. B01D 53/34
[52] U.S. Cl. .................................. 423/243; 423/228; 423/235
[58] Field of Search .............................. 423/227–229, 423/243, 242, 235

[56] References Cited

U.S. PATENT DOCUMENTS

| | | |
|---|---|---|
| 2,797,188 | 6/1957 | Taylor, Jr. et al. ................... 423/229 |
| 3,873,673 | 3/1975 | Teague et al. ........................ 423/243 |
| 3,904,735 | 9/1975 | Atwood et al. ....................... 423/243 |

Primary Examiner—Earl C. Thomas
Attorney, Agent, or Firm—Glwynn R. Baker

[57] ABSTRACT

A method for selectively separating sulfur oxides from carbon dioxide in an effluent gas stream by contacting the stream with solutions of alkanolamines at from 200°–230° F. At these temperatures the carbon dioxide is not absorbed to any degree by the alkanolamine while the sulfur oxides are quantitatively reacted. The spent alkanolamines are regenerated through the use of a weak base ion exchange resin in a cyclic process.

2 Claims, 1 Drawing Figure

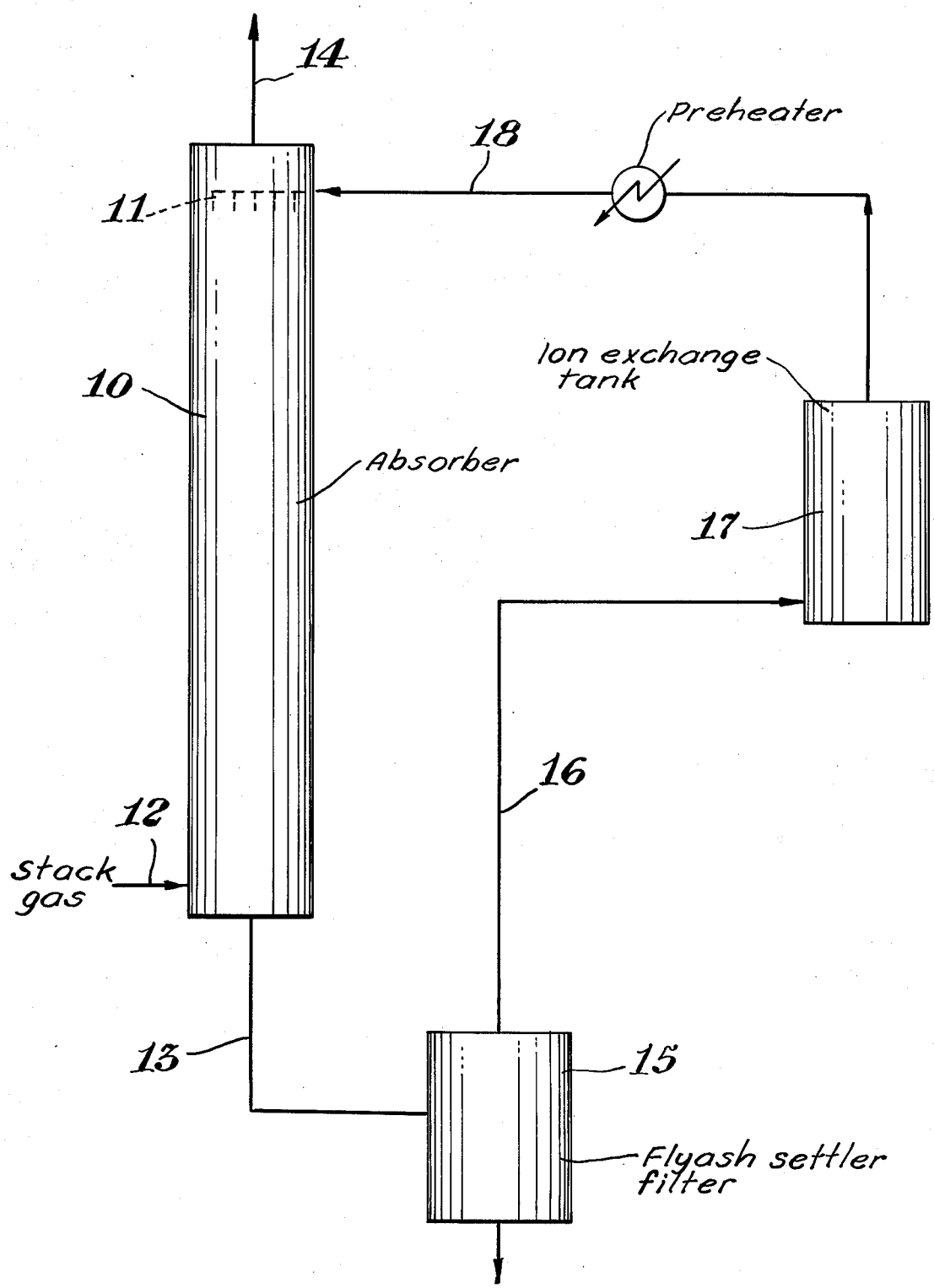

SELECTIVE SEPARATION OF SULFUR OXIDES FROM CARBON DIOXIDE IN AN EFFLUENT GAS STREAM

BACKGROUND

The pollution of the atmosphere due to industrial waste gases is a problem of ever increasing magnitude. Specifically, the emission of $SO_2$ in smelting and power plant stack gases is of primary concern and controls on the $SO_2$ concentration have been set by the Federal Government. A few states (California and New Jersey) have set 2000 ppm as maximum $SO_2$ in stack gas. New plants are warned that 500 ppm maximum is in the foreseeable future. In general, 2000 ppm is maximum allowable $SO_2$ concentration in most states. Stack gas from smelters typically will contain 7-8 percent $SO_2$, and from power plants about 0.4-0.6 percent $SO_2$.

The effluent stack gas from power generation plants is fairly typical of stack gases in respect to $SO_2$ and $CO_2$ content. In general, the ratio between $SO_2$ and $CO_2$ is 1-50.

The use of alkanolamines in combination with water for the absorption of acid gases is known. Such a process is disclosed, for example, in U.S. Pat. No. 2,797,188. Furthermore, the use of mixtures of alkanolamines with other compounds is also known. Such processes are disclosed, for example, in U.S. Pat. Nos. 3,039,251 and 3,387,917.

Reactivation of spent alkanolamine absorbents employed in cyclic processes for scrubbing acid gases by contacting the alkanolamine absorbent with a strongly basic anionic exchange resin is also described in U.S. Pat. No. 2,797,188.

However, in none of these processes is revealed the step of selectively absorbing the $SO_2$ in preference to the $CO_2$, thereby allowing the $CO_2$ to be vented without the need of stripping it or otherwise removing it or its corresponding alkanolamine salt from the absorbent medium.

STATEMENT OF THE INVENTION

It has now been found that when effluent stack gases are contacted with alkanolamine solutions at the stack gas top temperature (200°-230° F) selectivity for $SO_2$ over $CO_2$ is provided. At this temperature very little $CO_2$ will react with the absorbent; however, $SO_2$ and $NO_2$ will be substantially quantitatively removed along with fly ash.

The alkanolamine absorbent solution which has become inactivated by $SO_2$ and/or $NO_2$ in the main can be treated by a variety of methods. Thus, a strong inorganic soluble alkali can be used to react with the alkanolamine salts and thus regenerate at least a portion of the alkanolamine or it can be contacted with a strongly basic anionic exchange resin and regenerated thusly.

Preferentially the $SO_2$ and/or $NO_2$ rich solvent will be taken to a fly ash filter-settler and then to the $SO_2$ regeneration section. The $SO_2$, $NO_2$ and trace $CO_2$ will be removed in an ion exchange column containing a suitable exchange resin that can be efficiently regenerated with a weak base. The $SO_2$ free solvent is then recirculated to the absorber.

The use of ion exchange regeneration can be made flexible to the alkaline regeneration fluid used according to the market needs for a given area. For example, sodium sulfite could be sold to paper mills, or ammonium sulfite used for fertilizer applications. Sulfites could be oxidized to sulfates by air blowing if desired. If nitrogen dioxide is present the nitrogen dioxide ($NO_2$) will, of course, similarly be removed as the sodium or ammonium salt.

The use of a weak base exchanger works well with an alkanolamine in a diethylene glycol-water solution or triethylene glycol-water solution when the $NO_2$ concentration is low in the stack gas. Such a process is economical, saving on utilities used in regeneration and will provide $SO_2$ as Claus process feed. However, when both $SO_2$ and moderate to high $NO_2$ concentrations are present, the alkanolamines alone or as aqueous solutions are preferred, again in combination with the ion exchange regeneration technology hereinafter disclosed.

The invention is based upon the discovery of a preferential method for absorbing $SO_2$ and/or $NO_2$ from an effluent stack gas, and includes the discovery of the use of a weak ion exchange resin being particularly efficacious in a cyclic process through efficient regeneration of the exchange material.

The new and improved method of the present invention can be better visualized by reference to a particular illustration and through the accompanying drawing which is a schematic representation of embodiment of apparatus in which the method of this invention can be practiced. The drawing is intended to illustrate the orderly flow of process materials and is adapted through an orderly presentation of the description of the invention rather than implying any particular kind or arrangement of apparatus.

Referring to the drawing, 10 represents a vessel, generally called by absorber, absorbing column, or scrubber, for contacting an acid-containing fluid such as a stack gas entering through line 12. The effluent stack gas typically introduced through line 12 to scrubber 10 would contain $SO_2$, $CO_2$, $NO_2$, $NO$, $H_2O$ and fly ash. At the top of the scrubber alkanolamine solution is introduced through line 18 through heads 11. Thus the acid-containing gas stream is fed into the bottom of the vertical scrubber, which usually contains plate or packing materials, and passed upward countercurrent to the aqueous absorbent passing downward. The alkanolamine solution is preheated and introduced at the top of the absorber 10, at the stack gas temperature which is from about 200° to about 230° F. At this temperature the alkanolamine reacts with the $SO_2$ and the $NO_2$ and the $CO_2$, $NO$ and $H_2O$ escape upwardly through line 14. The $SO_2$ and $NO_2$ constituents of the effluent gas stream are absorbed by and reacted with the alkanolamine absorbent to form soluble, nonvolatile salts in which the alkanolamine supplies the cation and the absorbed acid supplies the anion. The spent absorbent is withdrawn from scrubber 10 through line 13 along with the fly ash to a fly ash filter settler 15 where the fly ash is separated from the spent absorbent which latter is allowed to continue through line 16 to ion exchange tank 17. Here the spent absorbent is activated by contact with certain anion exchange materials which are hereinafter particularly specified and the reactivated alkanolamine solution is again introduced through line 18 at the preferred temperatures to the scrubber 10, completing the cycle.

The organic solvents preferably employed in the selective separation of $SO_2$ and/or $NO_2$ from $CO_2$ in the present invention are alkanolamines which boil at or above about 350° F such as triethanolamine, diethanolamine, monoisopropanolamine, diisopropanolamine, and the like or the aminated polypropylene glycols either above or in admixture as well as each in combination with water or an ethylene or propylene glycol such as diethylene glycol, triethylene glycol, or tetraethylene as well as the higher molecular weight polyglycols, e.g. PG 400, E 400, P 400, while the lower boiling amines can be employed, e.g. monoethanolamine, their vapor pressures at the operating temperatures 200°–230° F is sufficiently high to result in losses of absorbent in excess of that economically feasible for commercial operation. Absorbents of the aforesaid classes boiling above about 500° F are operable but not necessary.

The $SO_2$ and/or $NO_2$ removal should be accomplished at about one atmosphere pressure. Contact between the gas and the absorbent can be made as shown in a vertical tower or the absorbtion may be made in a horizontal tower. In either case spray nozzles or other suitable low pressure drop contacts are employed. Bubble cap columns are generally not preferred because of the pressure drop.

The anion exchange materials preferably employed in the treatment of the alkanolamine absorbents in accordance with this invention are high capacity, weakly basic water insoluble resinous anion exchange materials. For example, styrene divinylbenzene copolymers, weak base resins, such as Dowex MW A-1, Dowex 44, Amberlite IRA 93, Duolite ES-308, and the like.

SPECIFIC EMBODIMENTS

Selectivity for $SO_2$

A 100 grams sample of 20 percent diethanolamine and 80 percent $H_2O$ was refluxed (220° F) after loading with $CO_2$ to saturation, for 3½ hours. During this time, 200 mls of $CO_2$/min was passed into the solution continuously. Sulfur dioxide was passed into the solution at 5 ml/min. A 0.1 N $I_2$ solution was used as a trap for the effluent gas as a check for unabsorbed $SO_2$.

Samples of the $I_2$ trap were taken after 1½ hours and 3½ hours and titrated with $Na_2S_2O_5$. No $SO_2$ was found. The titrations were equivalent to the titration of a like amount of $I_2$ solution was not exposed to $SO_2$.

Amount of $SO_2$ Used:

5 ml/min × 60 = 300 ml/hr
   300 × 3.5 hrs = 1050 ml total
   1050 × 0.00272 (grams $SO_2$/ml) = 2.86 gms. $SO_2$
   6 grams $SO_2$ will saturate 20 grams of diethanolamine at 1/2 mole $SO_2$/DEA Amount of $CO_2$ Used: (After saturation)

200 ml/min × 60 = 12,000 ml/hr
   12,000 × 3.5 hrs = 42,000 ml total
   42,000 × 0.00184 = 77.28 gms. $CO_2$ 8.3 grams $CO_2$ will saturate 20 grams DEA at mole/mole reaction.

Ion Exchange Data

To show the feasibility of ion exchange regeneration of an alkanolamine used for $SO_2$ removal, a weak base ion exchange resin was used for regeneration of the spent liquor. The ion exchange resin used was a macroporous weak base anion exchange resin (styrene-8 percent divinylbenzene copolymer chloromethylated and aminated with dimethylamine, Dowex MW A-1). A 20 percent aqueous solution of diethanolamine was saturated with $SO_2$ gas until the amine was entirely reacted. A known amount of the spent solution was then passed through a bed of the resin such that the resin was completely exhausted. This step determined the efficiency of the resin utilized. The resin column was then regenerated with caustic in an effort to determine if the exchanged sulfite could be removed thus allowing the resin to be reused.

The results are shown in Table I, below, and indicate that complete exchange and regeneration of the reacted sulfur dioxide is accomplished.

TABLE I

| Ion exchange regeneration of spent DEA | |
|---|---|
| Volume of NC-2077 used | 15.0 Mls |
| Concentration of $SO_2$ used | 40.6 MEQ |
| Excess $SO_2$ used | 19.0 MEQ |
| 40.6 − 19.0 = 21.6 MEQ of $SO_2$ exchanged | |
| 1 Ml resin = 1.4 MEQ of $SO_2$ | |
| Regeneration of exhausted resin | |
| Concentration of NaOH used | 43.4 MEQ |
| Excess NaOH used | 22.0 |
| NaOH used for regeneration | 21.4 |

21.6 $\overset{vs}{=}$ 21.4 or 100 percent removal of $SO_2$ and 100 percent regeneration of ion exchange resin

We claim:

1. In a method for selectively separating sulfur oxides from gas streams containing the same and carbon dioxide by contacting the gas stream with an alkanolamine solution, the improvement which comprises carrying out the contacting of the gas stream with the alkanolamine solution at from about 200° to about 230° F and regenerating the alkanolamine-sulfur oxide containing solution by contacting said solution with a weak base anion exchange resin.

2. In the method of claim 1 wherein said amine is treated to remove solid or particulate matter prior to contact with the resin.

* * * * *

UNITED STATES PATENT AND TRADEMARK OFFICE
CERTIFICATE OF CORRECTION

PATENT NO. : 4,071,602

DATED : January 31, 1978

INVENTOR(S) : Roscoe L. Pearce

It is certified that error appears in the above-identified patent and that said Letters Patent are hereby corrected as shown below:

Column 2, line 32, delete the word "by" and insert instead the word -- an --.

Column 3, line 41, delete the word "was".

Column 4, line 29 in Table I, "=" should appear instead as -- ≈ --.

Signed and Sealed this

Sixth Day of June 1978

[SEAL]

Attest:

RUTH C. MASON
Attesting Officer

DONALD W. BANNER
Commissioner of Patents and Trademarks